United States Patent Office 2,761,881
Patented Sept. 4, 1956

2,761,881

PROCESS FOR PRODUCTION OF 2,2-DISUBSTITUTED PROPANEDIOLS (1,3)

Jacob Rosin, Maplewood, N. J., assignor to Montrose Chemical Company, a corporation of New Jersey No Drawing. Application March 13, 1953,
Serial No. 342,261

11 Claims. (Cl. 260—635)

The synthesis of 2,2-disubstituted propanediols-(1,3) by interaction between a 2-alkylaldehyde, formaldehyde and a strong alkali is known. The lowest homolog of this series, 2,2-dimethyl propanediol, is made from isobutyraldehyde, which has a fairly high water solubility and can therefore be prepared in aqueous medium but the higher homologs, i. e., those having six or more carbon atoms, which are prepared from water insoluble aldehydes, required an alcoholic medium to create one phase between the reacting substances. This ordinarily required a rather large amount of alcoholic solvent, thus the volume of the reaction mixture is increased considerably and necessitates the additional operation of recovery of solvent used.

One object of this invention is to provide a process for manufacturing such diols without the use of an alcoholic solvent. I have discovered that if adequate agitation is provided, this reaction can be run as a two-phase reaction without the use of an alcoholic solvent.

Another object of this invention is to provide a process of making such diols wherein discoloration of the product is prevented.

I have found that such aqueous reaction, if run with an excess of formaldehyde at all times, meaning more than two moles of formaldehyde per mole of the 2-alkyl-aldehyde and one equivalent of alkali, no discoloration of the batch results. Discoloration is characteristic for such reactions run in an alcoholic medium, or reactions in which at any time an excess of alkali over formaldehyde is present, i. e., more than one equivalent of alkali per two moles of formaldehyde.

A further object of this invention is to produce a diol of a sufficient purity for commercial purposes without having to vacuum-distill it. In conventional production, vacuum distillation is necessary not only for color improvement but also for elimination of a high boiling residue, which is a polymerization product of the 2-alkyl aldehyde. I have found that the formation of this residue can be entirely prevented by running the reaction at high temperatures, above 70° C., and preferably at the reflux temperature of the reaction mixture. The reaction can be also executed at low temperature (as low as 10° C. over periods of 24 hours); however, to prevent polymerization of 2-alkyl aldehyde, very large excesses of formaldehyde are necessary without achieving at the same time a complete conversion of 2-alkyl aldehyde, so that, in general, the application of this method at higher temperatures is more economical than at low temperatures. Further, the alkali should be added to the mixture of the two aldehydes as rapidly as possible. Under these conditions, the diol formation is instantaneous whereas the rate of the competing side reactions is not increased in the same proportion, so that quantitative yields of diol (based on 2-alkyl-aldehyde) can be obtained.

A further object of this invention is to provide a method for the easy elimination of all impurities contained in the crude diol. When the reaction is run as described above, the only water insoluble contamination of the diol is unconverted 2-alkyl aldehyde. Since this aldehyde is, as a rule, lower boiling than the corresponding diol, it can be fractionated away in vacuum, leaving pure diol or residue. I have found that this fractionation is rather difficult when the amounts of aldehyde left are large (5% and over). Their elimination by aldehydic reagents such as bisulfite, phenylhydrazine, semicarbazide, and the like is also difficult. I have found that the most convenient elimination of this excess aldehyde is its transformation to diol by a large excess of formaldehyde, namely at least a 50% excess over theory and preferably about 125% over theory. Formaldehyde is a relatively cheap chemical as compared with the much more expensive 2-alkyl aldehydes. Parallel to formaldehyde excess the excess of alkali should be increased accordingly. This can be done without jeopardy to the color of the product as long as the ratio of formaldehyde to alkali remains the same, namely less than one equivalent of alkali to each two moles of formaldehyde. By increasing the excesses of formaldehyde and sodium hydroxide even further, I found that 2-alkyl aldehyde can be eliminated practically quantitatively so that no steam distillation is required and the propanediol formed is pure enough for commercial purposes on drying the water washed material. Thus, for instance, if one uses 150% excess of formaldehyde or more and a corresponding excess of alkali, the steam distillation can be entirely eliminated.

In certain cases, especially when large excesses of formaldehyde over sodium hydroxide are used to ensure a colorless reaction mixture, some of this excess formaldehyde may form polymers which are difficult to wash out by water and which may cause some coloration when they are eliminated by vacuum steam distillation. I found that these impurities can be eliminated by an alkaline wash. However, since excess alkali causes coloration in the presence of formaldehyde at temperatures over 70°, the alkaline wash has to be either executed at a lower temperature than 70° or, if higher temperature is desirable for purposes of better separation, the crude batch is given one water wash to remove the bulk of the formaldehyde excess, whereupon the treatment with diluted alkali can be executed at 90°, if desired. In actual plant practice, it is safer to combine both precautions and wash the crude batch at least once with water and then with diluted alkali below 70°. In case of 2-butyl-2-ethyl-propanediol (1,3), a wash with equal volume of 1.5% sodium hydroxide at 60° C. is adequate but, of course, then quantities can be varied without departing from the spirit of the invention. Following the alkaline wash, the material is washed thoroughly in water to remove sodium salts and excess sodium hydroxide. It is then stable to heat and will not change color on drying or steam-stripping.

As an alkali, I prefer to use sodium hydroxide, but other alkalis, such as potassium hydroxide, calcium hydroxide, etc., can be used without departing from the principle of this invention.

The following non-limiting examples illustrate my invention.

*Example I. 2 - ethyl - 2 - butyl - propanediol (1,3).—*
A mixture containing 385 grams 2 - ethylhexaldehyde (3 moles) and 1094 grams of a 37% formaldehyde solution (13.5 moles) is heated to reflux (about 93° C.) under vigorous stirring, then 480 grams of a 50% caustic soda solution (6 moles) are added in a thin stream from a funnel with a narrow delivery tip placed not too far from the surface of the agitated liquid. Throughout the addition of caustic soda, care must be taken to avoid local excesses, which may form when the caustic soda solution runs along the walls of the vessel or when refluxing takes place in the delivery tube (in these cases, a reaction takes place between the local excess of caustic soda and formaldehyde vapors), or in the case of inadequate agitation. The reaction is very exothermic and in order to be able to conduct the addition with maximum speed without choking up the reflux condenser, the reaction flask has to be cooled without, however, over-cooling it so as to stop refluxing. In about 20 to 30 minutes, the addition is completed and stirring and refluxing (heating is now necessary to maintain refluxing) continued for another 15 minutes. At this stage, the pH of the solution drops below 8 (about 7.3) and the reaction is considered completed. The organic layer is separated from the aqueous without cooling, then the organic layer is washed three times with 1.5 times its volume of hot water (80°–90° C.). Then it is dried in vacuum (15–20 millimeters) at 125° C. and steam stripped in vacuum at this temperature to remove any traces of 2-ethylhexaldehyde still present. Between 5% and 10% (of the wet weight of the diol) of steam is necessary to accomplish this. The final product weighs 436 grams (91% of theory), is water white and has a setting point of 40.0°–41.5° C.

*Example II. 2,2 diethyl propanediol (1,3).*—A mixture of 150.2 grams 2-ethyl-butyraldehyde (1.5 moles) and 547 grams (6.75 moles) of a 37% formaldehyde solution was refluxed under stirring and 240 grams of a 50% caustic soda solution (3 moles) was added, as described in Example I. Here, too, the reaction is completed 15 minutes after the addition of caustic is complete. Since 2,2 diethyl propanediol (1,3) has a considerable water solubility, the separation of the organic layer is done at room temperature after salting it out by addition of sodium chloride to make the aqueous layer a 20% NaCl solution. Then the organic layer is washed at room temperature three times with an equal volume of a 20% NaCl solution, dried in vacuum (15–20 millimeters) at 125°, filtered from salt and steam stripped in vacuum. About 3% (of the wet weight of diol) of steam is sufficient. The final product weighs 178.7 grams (90.3% of theory) and has a melting point of about 58.6°. Its color is white to light yellow.

In a similar manner, many other propanediols may be made using the appropriate 2-alkyl aldehydes. Thus, one employs 2-methyl butyaldehyde to make 2-methyl, 2-ethyl propanediol (1,3); 2 propyl valeraldehyde to make 2,2-dipropyl propanediol (1,3); 2-butyl caproaldehyde to make 2,2 dibutyl propanediol (1,3), and the like.

I claim:

1. The process for the preparation of 2,2-disubstituted propanediols (1,3), having more than 5 carbon atoms, comprising reacting formaldehyde, an aldehyde with an alkyl side chain in the 2-position and an alkali hydroxide in proportion of not less than 2 moles of formaldehyde per each mole of 2-alkylaldehyde and more than than 2 moles formaldehyde per one equivalent of alkali, said components forming an organic phase and an alcohol-free aqueous phase, and conducting the reaction under conditions of vigorous agitation.

2. The process of claim 1 wherein the reaction is conducted at a temperature higher than 70° C. and the alkali solution is added rapidly to the mixture of aldehydes, said mixture being cooled during this addition, while preventing local excesses of alkali.

3. The process according to claim 1 wherein the alkali is sodium hydroxide.

4. The process of claim 1 wherein over 100% excess formaldehyde and alkali is used based on the 2-alkyl aldehyde to convert substantially all of the 2-alkyl-aldehyde into diol, washing the diol so produced with an aqueous solution, steam-stripping from the residue any traces of 2-alkyl-aldehyde left, leaving behind pure and essentially colorless diol as residue.

5. Process according to claim 1 wherein the 2-alkyl aldehyde is 2-ethylhexaldehyde.

6. Process according to claim 1 wherein the 2-alkyl aldehyde is 2-ethyl-butyraldehyde.

7. Process according to claim 1 wherein the two phase reaction mixture consists of an organic phase and an aqueous phase, the phases are separated and the organic layer of the reaction mixture is subjected to a wash with a solution of a fixed alkali.

8. Process according to claim 7, wherein the fixed alkali is sodium hydroxide.

9. Process according to claim 7, wherein the alkaline wash is proceeded by at least one water wash.

10. Process according to claim 7, wherein the alkaline wash is executed at temperatures below 70°.

11. Process according to claim 1, wherein the excess of formaldehyde and alkali is sufficient to eliminate the necessity for removal of 2-alkyl-aldehyde in order to obtain pure commercial 2,2-alkyl-propanediol (1,3), such excess being at least about 150% of theory.

References Cited in the file of this patent

UNITED STATES PATENTS

| | | |
|---|---|---|
| 2,135,063 | Walker et al. | Nov. 1, 1938 |
| 2,329,514 | Cox | Sept. 14, 1943 |
| 2,369,083 | Spurlin | Feb. 6, 1945 |
| 2,400,724 | Walker | May 21, 1946 |
| 2,562,102 | Jackson et al. | July 24, 1951 |
| 2,612,526 | Gould | Sept. 30, 1952 |

OTHER REFERENCES

Whitmore et al.: J. A. C. S., vol 63 (1941), page 126.
Fieser and Fieser: Organic Chemistry (1950), page 203; D. C. Heath & Co., Boston.
Shortridge et al.: J. A. C. S., vol. 70 (1951), page 948.